United States Patent [19]

Van den Berghe et al.

[11] 4,142,024
[45] Feb. 27, 1979

[54] ELECTROLYTE-CATHODE ASSEMBLY FOR A FUEL CELL

[76] Inventors: Paul Van den Berghe, 43 Cours Sablon, 63000 Clermont-Ferrand, France; Helmut Tannenberger, La Villette 218, 1451 Le Chateau de Ste Croix, Switzerland

[21] Appl. No.: 801,391

[22] Filed: May 27, 1977

[30] Foreign Application Priority Data

May 28, 1976 [CH] Switzerland ............... 6738/76

[51] Int. Cl.$^2$ ............................ H01M 8/12
[52] U.S. Cl. ............................ 429/41
[58] Field of Search ............... 429/40, 41, 44

[56] References Cited

U.S. PATENT DOCUMENTS 3,558,360 1/1971 Sverdrup et al. ............... 429/40
3,834,943 9/1974 Van den Berghe ............... 429/41

*Primary Examiner*—John H. Mack
*Assistant Examiner*—H. A. Feeley
*Attorney, Agent, or Firm*—Haseltine, Lake & Waters

[57] ABSTRACT

An electrolyte cathode assembly for a solid electrolyte fuel cell intended for operation at high temperature comprises a solid ceramic electrolyte gas-tight body which is capable of conducting oxygen ions, the electrolyte having in contact with it and secured to its surface a layer of electron-conducting material which is a compact layer made up of a mixture of doped indium oxide $In_2O_3$ and a ceramic material which is capable of conducting both oxygen ions and electrons at the cell operating temperature, the said layer being covered with a surface layer, which is permeable to gas, of doped indium oxide $In_2O_3$ having a dendritic structure.

4 Claims, 3 Drawing Figures

ELECTROLYTE-CATHODE ASSEMBLY FOR A FUEL CELL

THE BACKGROUND OF THE INVENTION

This invention relates to an electrolyte-cathode assembly for a solid electrolyte fuel cell for operation at high temperature, comprising a solid ceramic electrolyte gas-tight body which is capable of conducting oxygen ions and at least one layer of an electron-conducting material in contact with the electrolyte and secured thereto.

It is known that in a certain kind of solid-electrolyte fuel cell which operates at a temperature usually of the order of 600° to 1000° C. the electrolyte is an oxide having cavities in its structure, such as stabilized zirconium dioxide, which has a relatively high oxygen ion conductivity in the aforementioned range of operating temperatures.

In a fuel cell of this kind the cathode is usually a layer of a metal, such as silver, which is a good conductor of electricity and does not oxidize under the cell operating conditions, the layer being in contact with the electrolyte and secured thereto.

Known metal cathodes are not entirely satisfactory, since they have the disadvantage of becoming detached, at least partly, from the electrolyte surface after a varying period of use, thus reducing their active surface. In addition, recrystallization may occur in metal cathodes and modify their porous structure and unfavorably influence their electrochemical properties and their lateral electric conductivity.

A considerable research effort has been made in order to find and develop cathodes having low polarization combined with a long life.

Swiss Patent Specification No. 478 463 describes an electrode which can be used both as a cathode and as an anode of a solid-electrolyte fuel cell operating at a high temperature. The electrode comprises a first porous layer made of granules of a ceramic material conducting oxygen ions and electrons, the first layer being in contact with the electrolyte and secured thereto, and a second porous layer covering the first layer and made of a material having high electron conductivity, such as a metal or ceramic material.

Swiss Patent Specification No. 540 571 describes an electrolyte-electrode assembly comprising a sealed-tight solid electrolyte body which is capable of conducting oxygen ions at high temperature and an electrode comprising at least one layer of doped indium oxide covering part of the surface of the electrolyte and adhering thereto, the doped indium oxide layer being made up of dendrites, the major axes of which are perpendicular to the surface of the electrolyte.

An object of this invention as exemplified hereinafter is to provide an electrolyte-cathode assembly in which the cathode has polarization characteristics at least as good as those of the electrodes described in the aforementioned Swiss Patent Specifications, but having a cathode life which is even better than that of the aforementioned electrodes.

SUMMARY OF THE INVENTION

According to the present invention there is provided an electrolyte-cathode assembly for a solid electrolyte fuel cell intended for operation at high temperature, which assembly comprises a solid ceramic electrolyte gas-tight body which is capable of conducting oxygen ions, and at least one layer of electron-conducting material in contact with the electrolyte and secured to the surface thereof, wherein the layer of electron-conducting material is a compact layer made of a mixture of doped indium oxide $In_2O_3$ and of a ceramic material which is capable of conducting oxygen ions and electrons at the cell operating temperature, the said layer being covered with a surface layer which is permeable to gas of doped indium oxide having a dendritic structure.

The material which is capable of conducting oxygen ions and electrons can have a composition similar to that of the solid electrolyte. It can, for example, be a mixed oxide comprising a solid solution, crystallized in the cubic system, based on zirconium oxide $ZrO_2$ and at least one oxide stabilizing the cubic phase of zirconium oxide, and uranium oxide $UO_2$.

The stabilizing oxide can inter alia be chosen from among oxides of the following elements: Ca, Mg, Y, Sc, and the rare earths. More particularly, mixtures of rare earth oxides can be used.

For example, the mixed oxide can be a solid solution, crystallized in the cubic system, containing at least 78 mol % and at most 86 mol % zirconium oxide; at least 8 mol % and at most 12 mol % yttrium oxide $Y_2O_3$ and at least 4 mol % and at most 12 mol % uranium oxide.

With regard to the doping element, the doped indium oxide can contain at least one of the elements which it is known to use for this purpose, inter alia one of the following elements: antimony, tellurium, gallium, zinc, tin, cadmium, germanium, tantalum, titanium, tungsten, chlorine or fluorine.

Preferably the doping element is tin, the proportion of tin being preferably from 1 and 5% of the atoms, with respect to the total number of indium and tin atoms.

Preferably the proportion of doped indium oxide in the mixture is at least 20% by volume and at most 80% by volume, the ceramic material which is capable of conducting oxygen ions and electrons making up the remainder of the mixture.

BRIEF DESCRIPTION OF THE DRAWINGS

The accompanying diagrammatic drawings, given by way of example, show an embodiment of an electrolyte-cathode assembly according to the invention, and two diagrams representing the polarization curves of the cathode. In the drawings.

Figure 1:
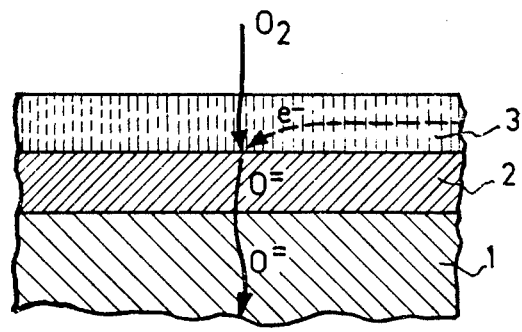
FIG. 1 is a diagrammatic representation, magnified and not to scale, of part of the cathode and of the electrolyte region adjacent the cathode.

The assembly shown in FIG. 1 comprises a compact layer 2 of a mixture of doped indium oxide and of a ceramic material which is capable of conducting oxygen ions and electrons at the cell operating temperature, placed on a sealed-tight solid electrolyte body 1 and secured thereto.

The electrolyte-cathode assembly shown in FIG. 1 also comprises a surface layer 3 of doped indium oxide which is permeable to gaseous oxygen and which covers the surface of layer 2 and is secured thereto.

As in the case of layer 2 the preferred doping element is tin, in a proportion of preferably from 1 to 5% of the atoms with respect to the total number of indium and tin atoms.

Preferably the dendritic structure of the doped indium oxide layer 3 is such that the major axes of the dendrites are perpendicular to the electrolyte surface.

The dimensions of the dentrites are preferably such that the major axes form trunks having a diameter of from 500 to 5000 Angstroms.

An aforementioned layer of doped indium oxide having a dendritic structure and a method of manufacturing the layer are described in Swiss Patent Specification No. 540,571.

In the embodiment of the assembly shown in FIG. 1, the thickness of the surface layer 3 of indium oxide having a dendritic structure is preferably at least 30 microns and at most 200 microns, and the thickness of the layer of mixture 2 is preferably at least 1 micron and at most 50 microns.

The operation of the electrolyte-cathode assembly in the embodiment shown in FIG. 1, in the case where the fuel used for operating the cell is oxygen or a gaseous mixture containing oxygen, such as air, is diagrammatically represented by lines terminating in arrows, indicating the direction of flow of molecular oxygen, electrons and oxygen ions (denoted by the conventional symbols $O_2$, $e^-$ and $O^=$ respectively).

Gaseous oxygen travels through the surface layer 3 and comes into contact with the surface of layer 2, where it is ionized by a supply of electrons transferred by lateral conduction through layer 3 and coming from the positive terminal of the cell (not shown in the drawing).

Ionization occurs in accordance with the following chemical equation (cathode reaction):

$$O_2 + 4e^- \rightarrow 2O^=$$

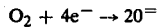

The thus-produced oxygen ions migrate through layer 2 and the electrolyte in succession, towards the anode of the cell (not shown), where they take part in the well-known anode reaction in the presence of the fuel.

The electrode-cathode assembly herein described has a structure which is particularly advantageous for obtaining a long service life.

The nature of layer 2, which comprises a material very similar to that of the electrolyte (the mixed oxide $ZrO_2$ and stabilizing oxide and $UO_2$) and another ceramic material (doped indium oxide) ensures excellent contact between the layer and the electrolyte; the contact suffers practically no deterioration with time, even when the cell is subjected to a very large number of heating and cooling cycles.

Furthermore, since layer 2 is made of ceramic material only, the crystallization phenomena previously mentioned in connection with metal cathodes are avoided in the case of the electrolyte-cathode assembly according to this invention.

The shape of the cathode depends of course on that of the solid electrolyte body, which can have any known shape, inter alia a disc, tube or plate.

Similarly, the cathode dimensions, inter alia its surface area, are adapted to those of the electrolyte body in accordance with the general configuration of the cell, following the criteria applied to the construction of cells of this kind.

The cathode can be manufactured by any suitable method, for example by known methods such as spraying powdered material on to the electrolyte body, using a flame or plasma torch; spraying at ambient temperature of a suspension of powder in a liquid containing a binder, followed by sintering the electrolyte-anode assembly so as to harden it or simultaneously harden the electrolyte and cathode; deposition by chemical reaction in the vapor phase (C.V.D.) or evaporation and condensation in vacuo.

Preferably the last-mentioned method is followed, using a vacuum chamber containing an evaporation and condensation device comprising an electron gun with a movable beam, so that the device can be used for evaporating two different materials simultaneously in adjustable manner.

The last-mentioned feature of the evaporation and condensation device can be used to form the layer 2 of the electrolyte-cathode assembly by simultaneous evaporation of doped indium oxide and the ceramic material which is capable of conducting oxygen ions, mixing in the vapour phase and continuous condensation of a layer of the mixture on to the surface of the solid electrolyte body.

EXAMPLE

An electrolyte-cathode assembly corresponding to the embodiment shown in FIG. 1, having the shape of a disc 2cm square in area and containing a compact layer 2, 10 microns thick, made of a homogeneous mixture having the following composition in percentages by volume:

Indium oxide doped with tin (composition corresponding to 4 mol % tin oxide $SnO_2$ and 96 mol % indium oxide $In_2O_3$): 77.6%

Solid solution containing 82 mol % zirconium oxide $ZrO_2$, 10 mol % yttrim oxide $Y_2O_3$ and 8 mol % uranium oxide $UO_2$: 22.4%

Layer 2 is obtained by simultaneous deposition of doped indium oxide and the aforementioned solid solution, in the proportions corresponding to the previously-indicated percentages, on to the surface of a disc of solid electrolyte (surface area: 2 cm²; thickness: 0.1 mm; composition: 90 mol % zirconium oxide $ZrO_2$: 10 mol % yttrium oxide $Y_2O_3$) by the process of evaporation and condensation in vacuo.

The assembly also comprises a gas-permeable layer 3 of indium oxide doped with tin (96 mol % $In_2O_3$: 4 mol % $SnO_2$) having a thickness of 90 microns, covering the surface of layer 2 and adhering strongly thereto. The lateral electrical resistance of layer 3 at 900° C. is 0.5 ohm . cm².

Layer 3 is made up of dendrites, the major axes of which are perpendicular to the surface of layer 2, (i.e. perpendicular also to the surface of layer 1), and have a very regular structure, as can be shown by examination under an electron microscope with stereoscopic scanning, the diameter of the dendrite trunks being of the order of 100 Angstroms.

Layer 3 is formed by deposition on the surface of layer 2, using the method of evaporation and condensation in vacuo in the manner described in Swiss Patent Specification No. 540,571 (i.e. bombardment by an electron gun of a target consisting of a cylinder of indium oxide doped with tin) in a vacuum chamber also containing the electrolyte body after it has been coated with layer 2.

In practice the same evaporation and condensation device is used for successively depositing layers 2 and 3 on to the surface of electrolyte body 1.

Figure 2:
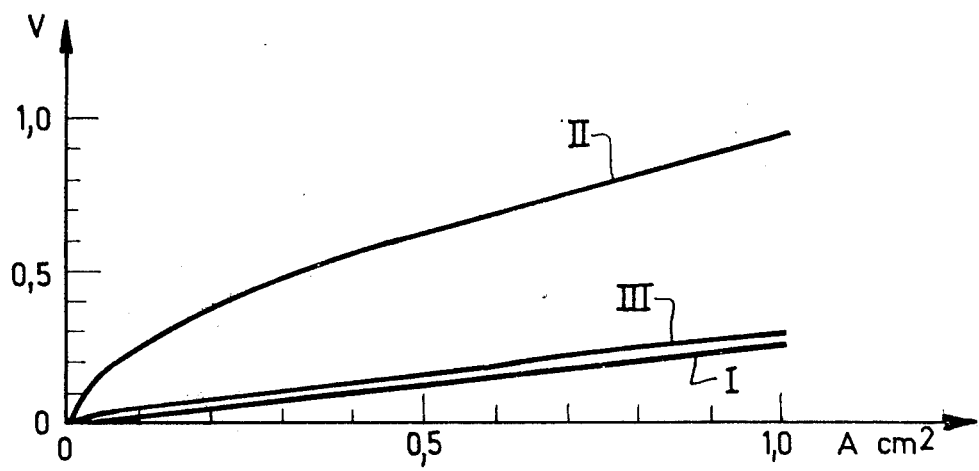
FIG. 2 shows the variation in polarization (expressed in volts) of a cathode according to the invention and of two known cathodes (for comparison) relative to the cathode current density (polarization curve).

The polarization curve of the electrolyte-cathode assembly described in Example 1 is shown in FIG. 2 (curve 1), the cathode and anode being in contact with a stream of air under the following conditions of measurement:

Type of counter-electrode: anode made of indium oxide doped with tin ($In_2O_3$: 96 mol %: $SnO_2$: 4 mol %) having a thickness of 100 microns, the anode being obtained by deposition, by evaporation and condensation in vacuo, on to the free surface of the electrolyte after it has been covered, likewise by evaporation and condensation in vacuo, with a layer of solid solution having the following composition: $ZrO_2$: 82 mol %; $Yb_2O_3$: 10 mol %; $UO_2$: 8 mol %, and a thickness of 3 microns.

Surface area of each electrode: 2 $cm^2$
Temperature: 900° C.

These polarization curves correspond to measurements made on cells which had operated for one hour before the measurements began.

By way of comparison, FIG. 2 shows the polarization curve (under the same measuring conditions as previously given) of two fuel-cell elements identical with those in the Example but comprising respectively as cathode: the first a layer of indium oxide doped with tin (96 mol % $In_2O_3$; 4 mol % $SnO_2$) identical with the previously-described layer 3 but directly placed on the surface of the electrolyte (curve II) and the second, a layer of a mixed oxide comprising a solid solution having the following composition: 82 mol % zirconium oxide $ZrO_2$; 10 mol % yttrium oxide $Y_2O_3$ and 8 mol % uranium oxide $UO_2$, the layer having a thickness of 10 microns and coated with a layer of indium oxide doped with tin (4 mol % $SnO_2$) identical with layer 3 (curve III).

A comparison between curves I and II in FIG. 2 shows a considerable reduction of the polarization obtained in the electrolyte-cathode assembly according to the invention, owing to the presence of layer 2.

In the case of an electrolyte-cathode assembly similar to that according to the present application but in which the layer 2 of a mixture of doped indium oxide and mixed oxide $ZrO_2$ - $Y_2O_3$ - $UO_2$ is replaced by a layer consisting only of the last-mentioned mixed oxide, there is a similar improvement in polarization after one hour of operation by the cell, as shown by comparison between curves I and III, but the situation is different with regard to the service life of the electrode-cathode assembly.

Figure 3:
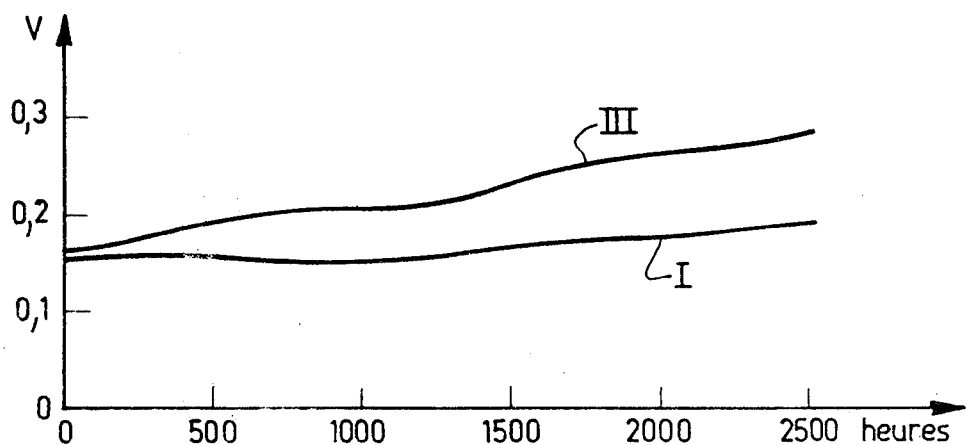
FIG. 3 shows the variation in the polarization of a cathode according to the invention and of a known cathode at a given cathode current density, relative to time (aging curves).

The clear superiority in this respect of the electrolyte-cathode assembly in Example I is shown by a comparison between curves I and III in the diagram in FIG. 3 (which shows the increase with time in the voltage drop between the anode and the cathode in (a) a cell element according to Example 1 and (b) an element identical with the element corresponding to curve III in FIG. 2, the voltage drop being measured under the aforementioned conditions for a current density of 0.5 A per square centimeter.)

We claim:

1. An electrolyte-cathode assembly for a solid electrolyte fuel cell intended for operation at high temperature, which assembly comprises a solid ceramic electrolyte gas-tight body which is capable of conducting oxygen ions, and at least one layer of electron-conducting material in contact with the electrolyte and deposited on the surface thereof, wherein the layer of electron-conducting material is a compact layer having a thickness of at least 1 micron and at most 50 microns and consisting of a mixture containing from 20 to 80% by volume of indium oxide $In_2O_3$ doped with tin oxide, the remainder being a ceramic material capable of conducting oxygen ions and electrons at the cell operating temperature and which is a mixed oxide solid solution crystallized in the cubic system, consisting essentially of (1) zirconium oxide $ZrO_2$, (2) at least one oxide stabilizing the cubic phase of zirconium oxide and (3) uranium oxide $UO_2$, the said layer being covered with a gas permeable surface layer having a thickness of at least 30 microns and at most 200 microns consisting essentially of indium oxide doped with tin oxide and having a dendritic structure.

2. An electrolyte-cathode assembly as claimed in claim 1 wherein the mixed oxide contains at least 78 mol % and at most 86 mol % of zirconium oxide; at least 8 mol % and at most 12 mol % of yttrium oxide $Y_2O_3$ and at least 4 mol % and at most 12 mol % of uranium oxide.

3. An electrolyte-cathode assembly as claimed in claim 1 wherein the tin in the tin oxide is present in an amount of at least 1% and at most 5% of the atoms with respect to the total number of atoms of indium and tin.

4. An electrolyte-cathode assembly as claimed in claim 1 wherein the dendritic structure of the surface layer is such that the dendrites have major axes which are perpendicular to the surface of the electrolyte.

* * * * *